July 2, 1968  L. SAVAGE  3,390,588
REMOTE CONTROL MIRROR
Filed Feb. 10, 1966  2 Sheets-Sheet 1
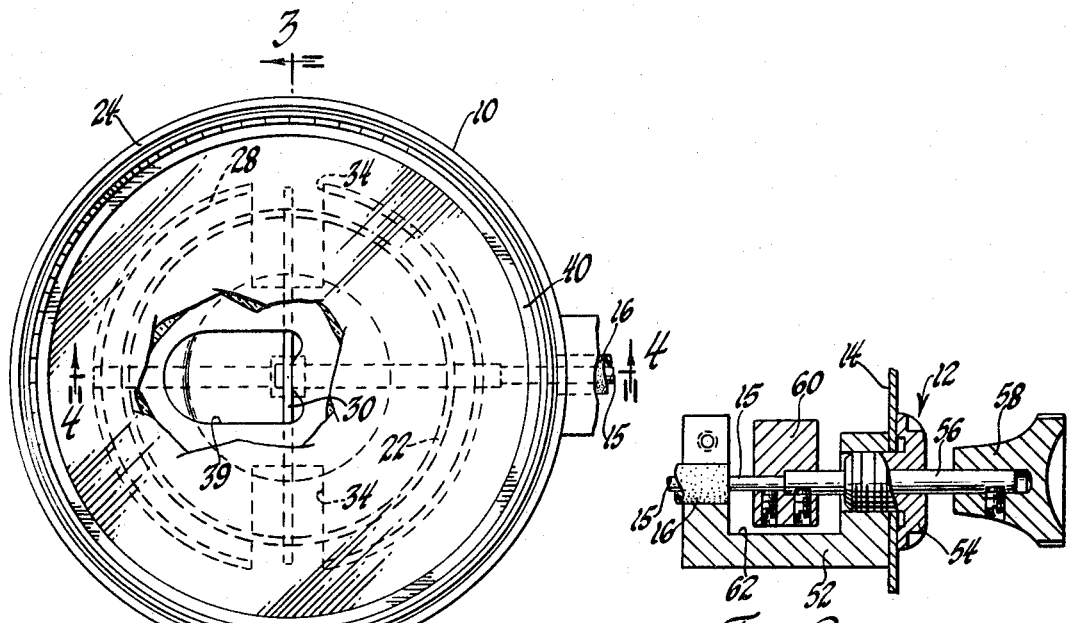
Fig. 1
Fig. 2
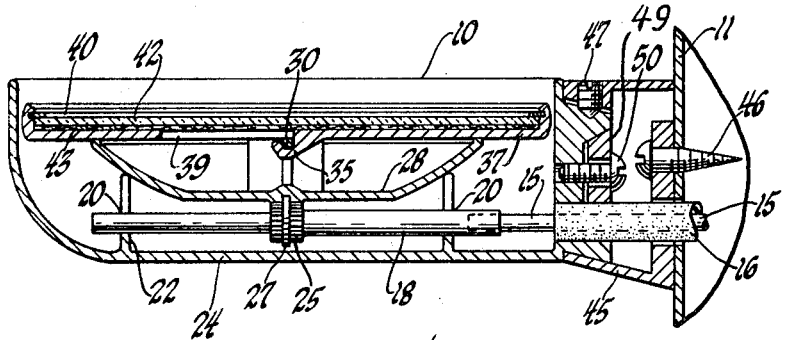
Fig. 4
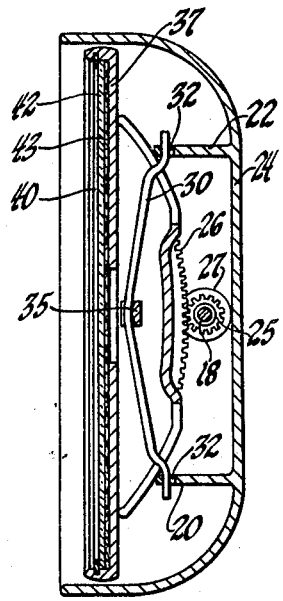
Fig. 3
INVENTOR.
Leonard Savage
BY
Dale A. Winnie
ATTORNEY July 2, 1968          L. SAVAGE          3,390,588

REMOTE CONTROL MIRROR

Filed Feb. 10, 1966          2 Sheets-Sheet 2

INVENTOR.
Leonard Savage
BY
Dale A. Winnie
ATTORNEY

United States Patent Office 3,390,588
Patented July 2, 1968

3,390,588
REMOTE CONTROL MIRROR
Leonard Savage, Dorr, Mich., assignor to Metalac Corporation, Grand Rapids, Mich., a corporation of Michigan
Filed Feb. 10, 1966, Ser. No. 526,606
12 Claims. (Cl. 74—501)

ABSTRACT OF THE DISCLOSURE

A remote control rear view mirror including a mirror member formed to include a spherical back wall, a support having an annular bearing wall for engagement with the back wall of the mirror near its outer periphery, and remote control means including an actuator connected by a flexible cable to rack and pinion means operative of the mirror through combined axial and rotary movement thereof.

---

This invention relates to rear view mirrors generally, but more specifically to remote control rear view mirrors for automotive use.

Numerous different types of remote control mirrors have been proposed, tried and rejected by automotive manufacturers and suppliers. Without going into the many different things that can go wrong, suffice it to say that construction and assembly cost must be low, installation simple, and operation effortless and fault-free.

To these ends, the present invention discloses a remote control mirror having a single control cable operator which by rotation or push-pull movement gives complete universal control sufficient for all necessary mirror adjustment.

Further, the single cable control operator reduces material costs and those of assembly and installation.

Beyond what has been mentioned, and of considerable importance, is that the mirror structure of the present invention includes no fixed pivotal axes or universal joint connection as is commonly known and so often suggested in remote control mirror construction.

The mirror of this invention makes use of an annular ring, standing like the lip of a coffee cup, and on which is received a saucer or dished member that holds the mirror part. Because of the spherical shape of the underside of the mirror supporting part, it floats or gyrates on the lip of the cup, or annular ring, when caused to move.

The significance of this will be immediately obvious to outside remote control and other mirror manufacturers who have fought the problem of mirror flutter for so long. To the uninitiated, this comment is directed to the problem having a universal pivot point or straight line axis which gives little or no support or stability to a mirror subjected to wind and vibrational forces, at its outer edges, when mounted on the outside of a car or other highway vehicle. Heretofore, the only solution has been a protective shroud around the back of the whole mirror.

With the outer, extended, and more peripheral engagement afforded by the "saucer-on-the-cup" arrangement here proposed, the shroud can be eliminated, with considerable cost savings, and a better and more stable mirror is assured.

It will also be appreciated, upon closer examination and study, that the gyrational movement afforded the mirror about a floating pivotal axis, as it is, enables more movement in less space than with a fixed axis. That is, in shifting the dished mirror support in one direction, its inner edge moves proportionally less inwardly than does its outer edge outwardly so that a more shallow support is required than would otherwise be the case. This will be described more fully in the specification which follows.

The advantages of this invention will, in fact, become more apparent during the course of the following description taken in conjunction with the accompanying drawings, and in which:

FIGURE 1 is a front elevational view of mirror mounting embodying the invention.

FIGURE 2 is a sectional view of mirror position control means embodying the invention.

Figure 5:
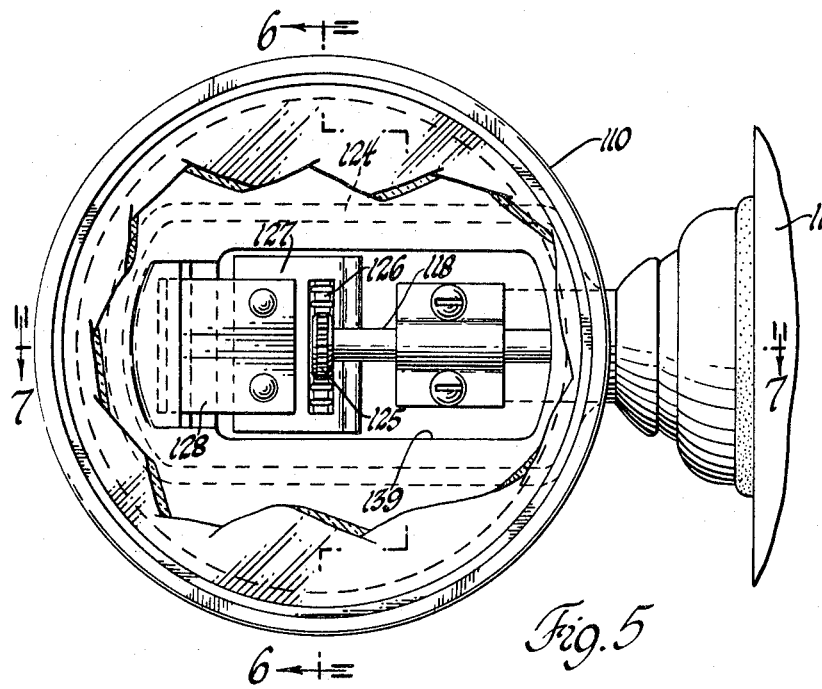
Figure 6:
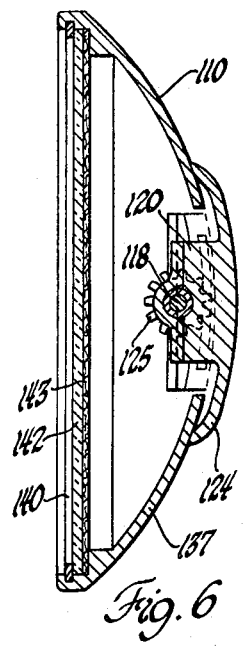
Figure 7:
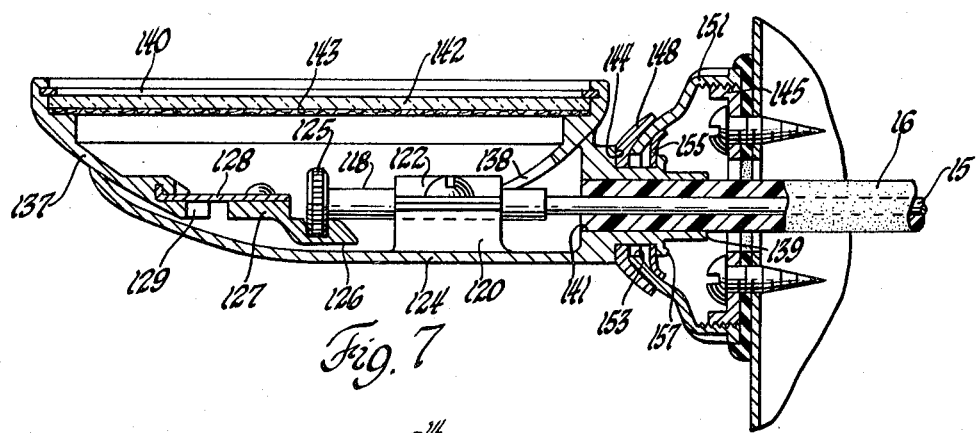
Figure 8:
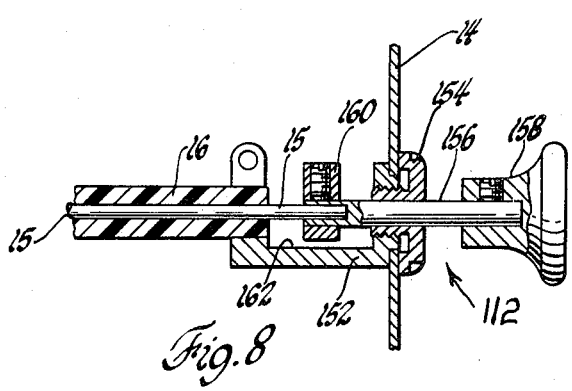

FIGURES 3 and 4 are, respectively, vertical and horizontal cross-sectional views of the structure of FIGURE 1 taken along the lines 3—3 and 4—4 thereof;

FIGURE 5 is an elevational view of mirror mounting means of another embodiment of the invention;

FIGURES 6 and 7 are, respectively, vertical and horizontal sectional views of the structure of FIGURE 5 taken along lines 6—6 and 7—7 thereof; and FIGURE 8 is a sectional view of another embodiment of mirror position control means.

Referring to the drawings, in still greater detail, and first to the embodiment shown in FIGURES 1-4, 10 designates the mirror mounting means shown in FIGURES 1, 3 and 4, which is desirably mounted on a fender or body panel 11, and 12 designates the mirror position control means shown in FIGURE 2 which may be mounted, as on an instrument panel 14, remotely from the mirror mounting means 10. The means 12 is interconnected with the means 10 by a flexible cable 15 which has one of its ends joined to one end of a shaft 18 rotatably and slidably mounted in diametrically disposed slots 20 cut into a circular ring 22 integrally formed within the mirror mounting housing 24. The shaft 18 has centrally mounted and secured to it a pinion gear 25 which meshes with an arcuately formed rack 26, provided on the back of a dish-shaped positioning member 28. The gear is actually split with a larger annular ring 27 in the middle and which serves a purpose later described.

The dish-shaped member or disc 28 is retained in frictional engagement with and on the periphery of the ring 22 by a retaining spring 30 which has its ends engaged in diametrically opposite appertures 32 formed in the ring 22 and spaced about a quarter turn from the slots 20, as best shown in FIGURE 3. The disc 28 has openings 34 formed in it to allow the ends of the spring 30 to project through the disc while the center portion thereof is captured by a hook structure 35 formed on the back of a mirror plate 37. This holds the mirror plate tight against the periphery of the positioning disc 28 and the latter on the ring 22.

The mirror plate 37 has an opening 39 formed in it, of the shape which is best shown in FIGURE 1, for permitting assembly of the spring 30 through the opening 39 and over the hook structure 35. The outer periphery of the mirror plate 37 is turned or crimped to form a bezel structure in which a retaining ring 40 or other means may be used to hold a glass mirror 42 against a gasket 43 which is first placed on the inner face of the mirror plate and prior to the insertion of the mirror 42.

The inner end of the mirror housing 24, is formed as best shown in FIGURE 4, so as to be received within a mounting base 45 which is secured to the fender or door panel 11 by a pair of mounting screws 46, one of which is shown in FIGURE 4. A set screw 47, threadably engaged in the mounting base 45, bears against the inner end of the mirror housing 24 to retain it in place. Before assembly of the mirror housing to the mounting base, the flexible cable 15, together with its coaxial cable housing 16, within which it is rotatably carried, is threaded through the mounting base 45 and through the panel 11 after first having been secured to the end of the shaft 18 as mentioned. Also before such assembly the cable housing 16 is locked to the inner end of the mirror housing 24 by a wedge shaped member 49, as shown in FIGURE 4. It cooperates with a complementary part formed on the inner housing end, such that when the lock screw 50 is threadably engaged and tightened down into engagement with the inner end of the housing 24 it holds the cable in place.

The other end of the cable housing 16 is secured in a mounting bracket 52 which is part of the position control means 12. The bracket 52 is threaded to receive a lock nut part 54 which is received from the face side through the mounting panel 14 and carries a shaft 56 rotatably therethrough with a control knob 58, fastened by a set screw, on its outer end as shown. The inner end of the shaft 56 is received in a fitting 60 with the opposite end of the flexible cable 15 and they are held by set screws. The fitting or connecting block 60 is disposed within a cavity 62 formed in the mounting bracket 52 and serves as a stop to prevent pulling out the ends of the flexible cable from their moorings, in case the control knob is pulled too hard, while still accommodating any slack which may develop in the flexible cable 15. It also serves as a rotational stop since it is eccentric in shape.

The mirror 42 is capable of rotational, or more properly, gyrational movement about an axis passing through its center and parallel to that of the shaft 18 simply upon rotation from a remote position of the control knob 58. The control knob 58, through the shaft 56, imparts axial rotary motion to the flexible cable 15 and to the shaft 18, which in turn, through the pinion 25 and rack 26, imparts rotary motion to the positioning disc 28 which carries the mirror plate 37 and the mirror 42. Such rotary motion permitted the mirror 42 is a double rotary motion, i.e., both clockwise and counter-clockwise, with respect to its axis of rotation. Its limits of travel with respect to the mirror housing 24 is determined by the effective length of the rack 26 which is arranged to permit maximum movement of the mirror without having the mirror plate 37 bump against the periphery of the ring 22 or, more likely, by the rotational limits of the connecting block stop 60.

The biasing action of the retaining spring 30 keeps the rack 26 tightly in engagement with the pinion 25 so that the mirror 42 remains in any of its rotational positions through which it is actuated by the control knob 58.

The mirror is also afforded movement by push-and-pull actuation of the control knob 58 which causes the ring member 27, at the gear face, to serve as an actuator and move the dished member or disc 28 on the ring 22 in a direction relatively normal to that afforded by rotation of the control. The flexible cable part 15, in the sheath 16, moves the shaft 18 back and forth, carrying with it the gear part and the dished member which carries the mirror. As mentioned earlier, the spring 30 holds the assembly together and particularly the rack and pinion parts closely engaged so that they can sustain this action.

Referring now to the embodiment shown in FIGURES 5-8, 110 designates the mirror mounting means shown in FIGURES 5, 6 and 7 which is desirably mounted on the panel 11, as mentioned, and 112 designates the mirror position control means shown in FIGURE 8 which, as before mentioned, may be mounted on the instrument panel 14 remotely from the mirror mounting means 110.

The control means 112 is interconnected with the means 110 by the flexible cable 15, as in the prior embodiment. However, in this instance, the shaft 118 is rotatably and slidably mounted in an open bearing 120, closed by a retainer cap member 122 that is removably fastened, as shown in FIGURES 5 and 7, over the journal bearing part. The end of the shaft 118 has a pinion gear 125 provided on its terminal end and which meshes with a straight rack toothed part 126 formed on a part 127 which is fastened, as by rivets, as shown, to one end of a spring member 128. The other end of the spring 128 is engaged in a suitable locking structure 129 formed on a mirror back 137 to hold it as desired.

The mirror back 137 has a dished construction as shown, and as before, an enlarged opening 139 formed in its center through which the shaft 118 and the pinion 125 project. The locking structure 129 is formed at one side of this opening 139 and holds the spring member 128 in cantilever fashion so that the free end of the latter presses the rack 126 against the pinion 125 by which action the entire mirror back 137 is held against the periphery of the mirror housing 124 and maintained in frictional contact therewith during rotational movement of the mirror 142.

The mirror 142 is held in the mirror back 137 against a gasket 143 by a retaining ring 140 as in the prior embodiment.

Before assembly of the mirror 142 into the mirror back 137 the latter is assembled in the mirror housing 124 with the rack 126 in engagement beneath the pinion 125. Thereafter the bearing cap 122 may be fastened to the bearing 120 to hold the shaft and hence the pinion 125 against the rack 126 which is yieldably engaged into engagement with the pinion 125 by the spring member 128. Otherwise, and in certain embodiments, it is also conceivable that the gear part could be sprung into place.

The inner end of the housing 124 includes a tubular part or extension, as at 139, and the cable housing or sheath 16 is threaded through such end 139 when the cable 15 is secured to the shaft 118.

The tubular part 139 of the housing 124 is formed with a shoulder 144 which receives a spherical or ball headed cap 148 in engagement therewith and which is assembled over such end with a threaded retaining member 151 that bears against the inside of the ball cap 148. The retaining member 151 has a control aperture 153 which is enlarged in respect to the diameter of the tubular end 139 for reasons which will appear.

The member 151 and the ball cap 148 are yieldably urged into frictional contact with each other by a spring member 155 which is slipped over the tubular end 139 of the housing part and locked in position thereon by swaging the tubular end as shown and indicated at 157. By this construction the member 151 is capable of rotating with respect to the housing 124 so that it may be rotated to threadably engage a mounting base 145 which is threaded in this instance and secured to the panel 11 by a pair of sheet metal mounting screws as shown.

The enlarged aperture 153 in the member 151 allows the mirror housing 124 to be rocked so that the mirror can be adjusted after mounting to bring it into better position for remote control actuation. In this rocking motion of the housing 124 to position it, the ball cap 148 moves with frictional engagement with the spherical outer surface on the member 151 while the spring member 155 frictionally engages the spherical inner surface of the same member 151.

The opposite or control end of flexible cable 15 is secured to the end of a shaft 156 which includes a knob 158 as in the prior embodiment. In this instance the connecting block 160 is secured to the shaft 156 by a single set screw, as shown, but is otherwise allowed the same travel and rotation in the cavity 162 of the mounting bracket 152. The mounting block is secured to the instrument panel as before by a retainer member 154.

The operation of the embodiment shown in FIGURES 5-8 is like that described for the prior embodiment in that rotation of the control knob 158 imparts a rotary motion to the mirror back 137 and hence to the mirror 142 which is carried thereby. Push-pull movement imparts a like but different rocking movement. The extent of rotational movement in both respects is limited principally by the limits afforded the stop 160, as before.

The mounting structure described for the inner end of the housing 124 enables the mirror 142 to be pre-set for right or left door use and in the best position to be rotated by the incoming end of the flexible cable 15.

From the foregoing, it will be seen that a remote control mirror structure with a single remote control cable actuator has been provided which, aside from its simplicity of construction, manufacture, assembly and installation, has many advantages.

It will also be appreciated that while the specific construction disclosed has certain advantages and novelty over other and known prior remote control mirror structures, the principles set forth are of most importance and significance and are to be given full recognition in whatever form they appear.

The shrouded structure of FIGURES 1-4 is, for example, only decorative, and, in fact, the full annular run of the ring 22 is not necessary. As the embodiment of the subsequent figures shows, no shroud and a simple cupped upright support 124 is enough.

The two embodiments also show that the engagement and control of the mirror holding part may be from within the spherical mirror case, as in FIGURES 5-8, and thereby a narrower construction is conceivable.

It is also made apparent that separate or interchangeable mirrors for right or left door mounting, and different model cars, is possible and quite practical.

With respect to the earlier comment that the floating axis affords less movement of the adge of the mirror inwardly than outwardly, this is because as the one edge moves inwardly, and towards the edge of the peripheral support means, the other edge and the pivot center is shifted outwardly. With the mirror flat, or centered, the pivotal point is lowest in the annular ring and it can only move to a relatively higher position and consequently the outer disposed edge must move the greater distance.

Without further discussion it will be appreciated that other embodiments and improvements are conceivable and to the extent that they are within the spirit and scope of the hereinafter appended claims they are to be considered as inclusive thereunder.

I claim:

1. An automotive remote control mirror construction comprising mirror mounting means for a mirror adapted to be mounted on the exterior of a vehicle, mirror position control means adapted to be mounted on the interior of said vehicle including structure for imparting axial rotary and push-pull motion to a flexible cable, rotational mounting structure included in said mirror mounting means including a mirror back having engaging means thereon, a flexible cable having one end connected to said position control means and having cooperating engaging means on its other end for co-action with the first-mentioned engaging means whereby double acting rotational motion and push-pull motion is imparted to the mirror back upon actuation of said position control means, the mirror back being provided with a dish shaped member to which a rocking motion is imparted upon axial rotation of the flexible cable, said mirror mounting means includes peripheral engaging means for frictionally contacting said dish-shaped member and spring means, said spring means retaining the dish-shaped member yieldably against said peripheral engaging means during rotational movement of said mirror back.

2. Apparatus as claimed in claim 1 in which said first-mentioned engaging means and the engaging means on the flexible cable end comprises rack and pinion means by which such rocking motion of the dish-shaped member is accomplished.

3. Apparatus as claimed in claim 1 in which the spring means has parts engaged with the mirror back in urging the dish-shaped member into frictional engagement with said peripheral engaging means being provided on a mirror housing included in said mirror mounting means.

4. Apparatus as claimed in claim 3 in which the spring means yieldably urges said rack and pinion means into mutual engagement.

5. Apparatus as claimed in claim 4 in which the spring means has parts engaged with said mirror housing, said mirror housing serving as a shroud for the mirror back.

6. Apparatus as claimed in claim 1 in which said mirror mounting means includes a mirror housing and flexible mounting means including a base therefor by which the housing may be rocked on its base after mounting for adjustment in respect to the flexible cable end which enters said housing.

7. Apparatus as claimed in claim 6 which includes spherical engaging surfaces between the mirror housing and its base and spring means for yieldably urging such spherical surfaces into mutual engagement and for retaining the mirror housing in its adjusted rocked positions in respect to said base.

8. A remote control rear view mirror, comprising;
a mirror member and a support for mounting it on the exterior of a vehicle,
operative means provided within said support for positioning said mirror relative to said support,
control means adapted to be mounted on the interior of a vehicle and having a flexible cable connected thereto and to the operative means within said mirror support,
said mirror member and support being formed for complementary engagement therebetween including a spherical surface on one and an annular bearing surface wall on the other providing engagement therebetween near the outer periphery of said mirror member,
and means provided within said support for retaining said mirror member in biased engagement therewith and for relative movement thereon in the actuation of said control means.

9. The remote control mirror of claim 8,
said flexible cable including a single strand sheathed cable having the sheath thereof fixed at opposite ends and being adapted for axial and rotary movement operative of said mirror positioning means.

10. The remote control mirror of claim 8,
said mirror member having the spherical surface provided thereon and said support being formed to receive said mirror member in shrouded relation therewithin and to include said annual bearing surface wall on the inner back wall thereof.

11. The remote control mirror of claim 10,
the operative means for positioning said mirror member including a gear pinion shaft extended through said annular bearing surface wall and journalled thereon for axial and rotary movement operative of said mirror member.

12. The remote control mirror of claim 10,
said operative means extending through said annular support wall and within the spherical surface on said mirror member.

References Cited
UNITED STATES PATENTS

| | | | |
|---|---|---|---|
| 2,091,165 | 1/1936 | Hadley et al. | |
| 2,855,825 | 10/1958 | Feder | 74—501 |
| 3,225,621 | 12/1965 | Augunas | 74—501 |
| 1,407,802 | 2/1922 | Olinger | 74—501 X |
| 1,560,039 | 11/1925 | Castino | 74—501 X |
| 1,630,217 | 5/1927 | Rasor | 74—501 |
| 2,456,362 | 12/1948 | Aves | 74—501 |
| 2,614,437 | 10/1952 | Meggit | 74—501 |
| 3,251,238 | 5/1966 | Fuqua | 74—501 |

FRED C. MATTERN, Jr., *Primary Examiner.*

C. F. GREEN, *Assistant Examiner.*